United States Patent [19]

Ricci

[11] E Re. 29,246

[45] Reissued May 31, 1977

[54] DATA TRANSFER CONTROL APPARATUS AND METHOD

[75] Inventor: David W. Ricci, Mountain View, Calif.

[73] Assignee: Hewlett-Packard Company, Palo Alto, Calif.

[22] Filed: Apr. 28, 1976

[21] Appl. No.: 680,812

Related U.S. Patent Documents

Reissue of:

[64] Patent No.: 3,810,103
Issued: May 7, 1974
Appl. No.: 240,403
Filed: Apr. 3, 1972

[52] U.S. Cl. ..... 340/172.5; 340/147 LP; 340/163

[51] Int. Cl.[2] ..... H04Q 1/00

[58] Field of Search ..... 340/172.5, 146.1 BA, 340/147 LP, 163

[56] References Cited

UNITED STATES PATENTS

| | | | |
|---|---|---|---|
| 3,378,820 | 4/1968 | Smith | 340/172.5 |
| 3,390,379 | 6/1968 | Carlson | 340/172.5 |
| 3,403,382 | 9/1968 | Freilinghaus | 340/172.5 |
| 3,407,387 | 10/1968 | Looschen | 340/172.5 X |
| 3,539,998 | 11/1970 | Belcher | 340/172.5 |
| 3,559,184 | 1/1971 | Rawlings | 340/172.5 |
| 3,609,698 | 9/1971 | McCormick | 340/172.5 |
| 3,676,846 | 7/1972 | Busch | 340/146.1 BA |

*Primary Examiner*—Raulfe B. Zache
*Attorney, Agent, or Firm*—A. C. Smith

[57] ABSTRACT

An improved data transfer system enables a common data source to operate asynchronously with a plurality of different data receivers at a data transfer rate that is limited only by the operating rates of the data receivers and the data source. The operating conditions of the data receivers are sensed in common by the data source and the operating condition of the data source is sensed by the data receivers in order to optimize the data transfer rate without loss of data and without restriction to a predetermined (or synchronous) data transfer rate.

20 Claims, 4 Drawing Figures

DATA TRANSFER CONTROL APPARATUS AND METHOD

Matter enclosed in heavy brackets [ ] appears in the original patent but forms no part of this reissue specification; matter printed in italics indicates the additions made by reissue.

BACKGROUND OF THE INVENTION

Certain known data transfer systems use data lines for the transfer of both data and addressing information between a source and a plurality of receiving modules. These systems require that all receiving modules operate momentarily in a common address-receiving condition to assure that subsequently-appearing data signals may be applied to the proper receiving modules. The timing restrictions thus imposed generally limit the data transfer operation to a sequence of events, each of which must be performed within specified time periods and usually restricts the data transfer to only one receiving module at a time.

SUMMARY OF THE INVENTION

In accordance with the present invention, the conditions of all data receivers are sensed in common to determine that all such receivers are "ready for data" (RFD), and thereafter that all such receivers have "received data" (DAC). The present invention recognizes that different data receivers such as output displays, printers, encoders and the like, generally have different response times to applied data signals, and that such receivers may also require different periods of operation before being ready again to respond to newly applied data signals. Accordingly, each data receiver includes circuitry for indicating that it has received the applied data signals and also for indicating when it is ready to receive new data signals after completing its operation on the data signals previously applied.

DESCRIPTION OF THE PREFERRED EMBODIMENT

Figure 1:
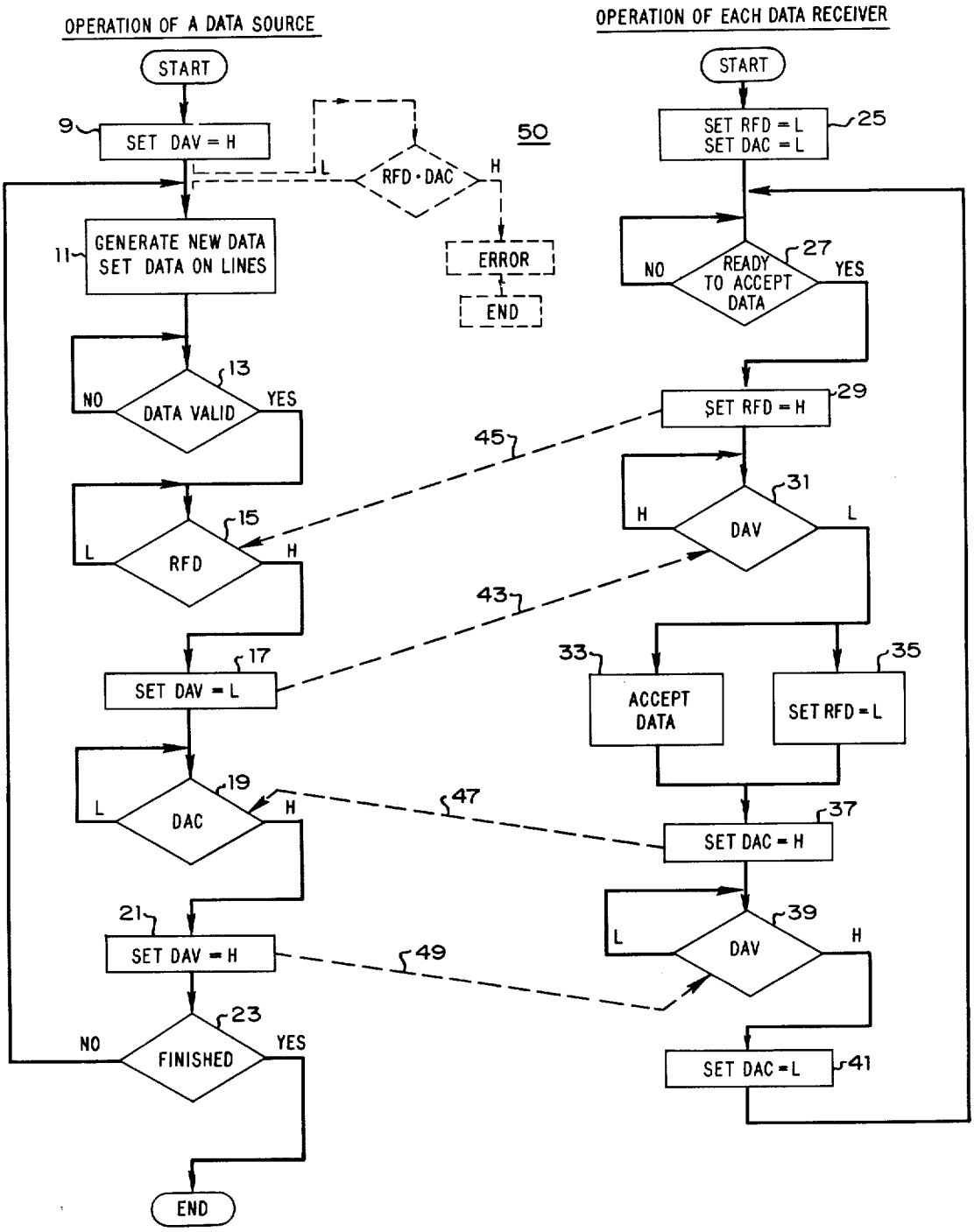
FIG. 1 is a flow chart showing the operating states of the data source and data receivers, according to the present invention.

Referring now to the flow chart of FIG. 1, the operation of the present data transfer system can be considered from three points of view, namely; from the data source or device that generates the data to be [ trrnferred ] *transferred;* from the data receiver; and from the interaction between the data source and the data receiver or receivers.

First, with respect to the data source, this device begins its operation by setting a DAV line 9 to the "high" logic state. This initializes the sequence. Next, the data source generates the data 11 by whatever means it uses. For example, a counter may output data from its display register as later described with respect to FIG. 2. In a [ serial display ] *serial-display* register or scanning-type display the data for each digit display may be available sequentially as the data per digit is multiplexed onto the data lines. Data is thus applied to data lines through suitable drivers by a source of this type. A selected period of time is required to allow the data to settle down on the data lines. This takes into account such matters as signal rise and fall times, propagation delays, reflections on the data lines and the like. The data is valid only after such transient conditions have settled down. The data receivers are restricted to operation on data only while the data is valid. When the data source determines that the data is valid 13, it must then determine whether the receivers are ready to accept data 15. The "ready for data" (RFD) signal is produced in the manner as later described in connection with FIG. 3 when all receivers on the line are ready for data. If any one or more of the receivers are not ready for data, the RFD signal will be "low;" and when all receivers are ready, the RFD signal will be "high" (by the convention selected for this illustrated embodiment). The data source may then proceed by setting the DAV [ line ] *signal* "low" 17 which indicates to all of the receivers that the data on the lines is now valid and may be accepted any time thereafter. The data source waits for all of the receivers to accept the data 19. When all of the receivers have accepted the data, a "data accepted" (DAC) signal is produced in the manner later described in connection with FIGS. 2 and 3. When the data source senses the DAC signal indicating that all of the receivers have accepted the data, the source then sets the DAV [ line ] *signal* "high" 21, thereby indicating that the data is being removed and will no longer be valid. The source then finishes 23 or repeats the cycle by returning to the generate-new-data phase and repeating the entire sequence of events previously described.

With respect to the data receivers, each receiver starts by initializing two signals (RFD, DAC) to the "low" state 25. The receiver indicates when it is ready to accept data 27 by setting its RFD signal "high" 29. This may occur, for example, after a printer motor has to come up to speed, or after a paper tape punch pawl has returned to its rest position, or the like. When the receiver is ready to accept the data and has produced its RFD signal, no operation will occur until the DAV signal appears, indicating that the data on the line is valid. The receiver senses the DAV [ line ] *signal* 31 to determine when that [ line ] *signal* goes "low" as an indication that the data on the line is now valid or meaningful. The receiver then accepts the data 33 at any time thereafter and also sets RFD "low" 35 to indicate that the receiver is no longer ready to receive data. After the receiver has received the data (which it may do according to its own data transfer rate), it indicates that the "data is accepted" (DAC), by setting the DAC [ line ] *signal* "high" 37. After that operation, the receiver responds further only after the source has set the DAV [ line ] *signal* "high" again indicating that the data has been removed. When the receiver senses that the DAV [ line ] *signal* goes "high" 39, the receiver sets the "data accepted" (DAC) [ line ] *signal* "low" 41 and returns to the beginning of the cycle for a subsequent data transfer operation.

With respect to the interaction between a data source and one or more data receivers, the operating states of the devices are sensed by interrogating *43–49* the signals produced on three control lines during each state of operation. The source drives the data-valid (DAV) [line] *signal* to [signal] *indicate* the validity of the data on the data lines. A receiver interrogates *43* the DAV line [43] to determine when it may accept the data. The receiver also [signals] *indicates 45, 47* its ability to accept data and its readiness for new data using the RFD and DAC signals [45, 47] respectively. The source interrogates these two signals to determine if it may proceed to its next step. Each operating step of each device is conditioned upon the execution of a preceding operating step by the other device, as indicated in FIG. 1 by the dotted lines 45–49 between the operations and qualifiers of source and receivers. In this way, a source and a plurality of receivers are synchronized for operation at a self-determined data transfer rate.

The present data transfer system avoids transfer blockages or "hang-ups" of the entire system under conditions where all of the receivers are not on the line due, for example, to a cable disconnect or power failure, or the like. In this condition, the RFD and DAC lines of the data receivers will revert to the "high" state where the logic elements used are of a type subsequently described in FIG. 3 selected for this illustrated embodiment that assumes the "high" state under the conditions of a cable disconnect or a power failure or the like. A source operating according to the algorithm of the present invention (shown in the left-hand side of FIG. 1) under the above conditions will race through that sequence of operations as if the receivers were present and accepting the data normally, thereby preventing a "hang-up" condition which would inhibit operation of remaining data receivers. In addition, if any one or more, but not all, of the receivers is inoperative and has set RFD and DAC "high," it will not effect the operation of the other receivers. In contrast, conventional data transfer systems usually stall in an operating state waiting for the receiver, which has become inoperative due to disconnection or power failure or the like, to accept the data. Alternatively, the source operating algorithm may be modified, as shown at 50 in FIG. 1, to include an interrogation of both RFD and DAC lines to determine the presence of the common "high" condition on these lines as being indicative of an error conditon (ie., a receiver cannot physically be both ready for data and have accepted data). Thus, in accordance with the present invention, a source and multiple receivers of various response or operating speeds can be combined for data transfers therebetween at transfer rates determined only by the slowest of the devices involved.

Figure 2:
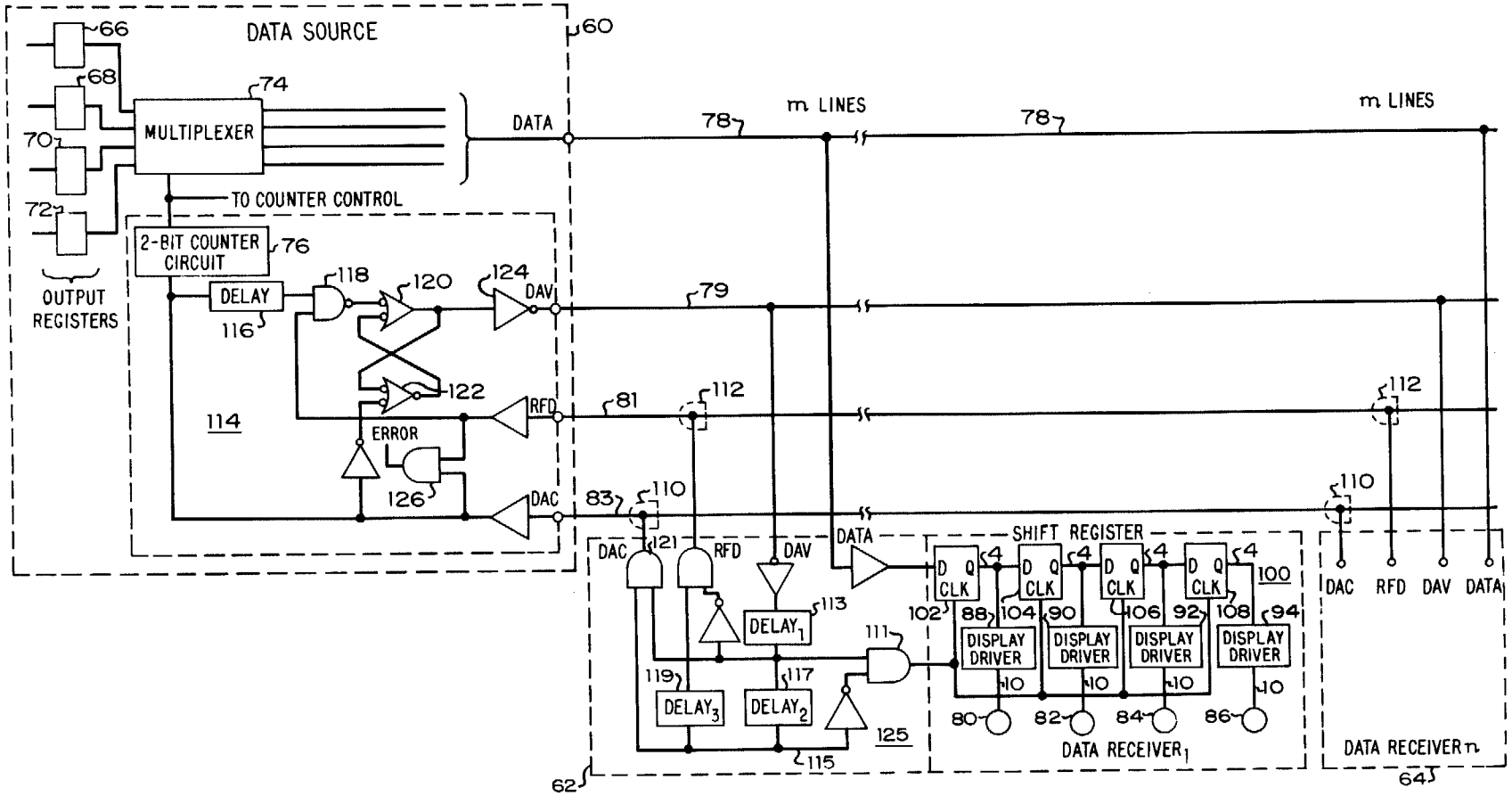
FIG. 2 is a schematic diagram of one embodiment of the data transfer apparatus of the present invention.

Referring now to FIG. 2, there is shown a simplified schematic diagram of the data transfer apparatus of the present invention. The apparatus includes data source 60 and a plural number of data receivers 62, 64 etc. The data source may include a counter having a plurality of output registers 66, 68, 70, 72 as a portion of the output circuitry of the counter. Each of these output registers is coupled to a multiplexer 74 which is driven by a two-bit counter circuit 76 such that the data signals from each of the registers 66–72 is supplied in sequence over m lines of the data lines 78 in response to each of the four states of the counter 76. The data source 60 also includes logic circuitry for providing a signal on the data-valid line (DAV) in response to a logical combination of the signals appearing on the "ready for data" (RFD) and "data accepted" (DAC) lines.

Figure 3:
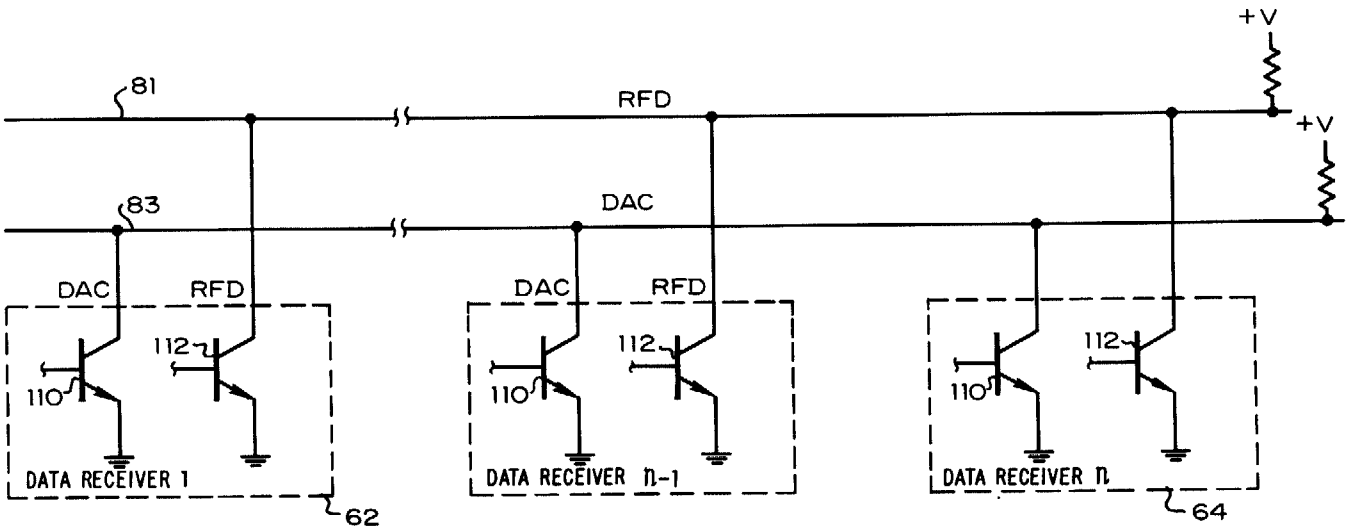
FIG. 3 is a schematic diagram of typical collector logic circuitry that may be used as the distributed gates for the control lines of the apparatus of FIG. 2.

Each of data receivers 62, 64 etc. may include suitable means operative upon the data signal on lines 78 and in general may include remote display devices, paper tape punchers, card punchers, printers, and the like. In the illustrated embodiment, there is shown a remote display device including a plurality of glow-discharge numerical indicators 80, 82, 84 and 86, each driven by its respective display drivers 88, 90, 92 and 94. This data receiver may be operated to actuate the output indicators 80–86 in sequence using the time multiplexed data signals appearing on the data lines 78 clocked into successive registers of the shift register 100 in a fashion to be described hereinafter. Each of the registers 102, 104, 106, 108 of the shift register 100 may be a D-type flip-flop simply arranged to operate as a shift register having a single data input port capable of accepting m lines of data signals. Each data receiver also includes logic elements for producing at its own response rate the "ready for data" (RFD) signals and "data accepted" (DAC) signals in response to reception of the data and the "data-valid" (DAV) signal appearing on lines 78 and 79. These signals are coupled in common via distributed gates 110, 112 shown in dotted form in FIG. 2 to the common lines 81 and 83 that are connected to the data source 60. These gates may be distributed in the data receiver or may be accumulated at a central point along these control lines where convenient, and may simply include conventional transistor-collector logic circuitry as shown in FIG. 3.

In operation, the data transfer apparatus of the present invention may be considered first from the standpoint of the data source 60. At the end of a suitable operating period, data may be accumulated in each of the output registers 66–72 ready for distribution to the data receivers 62, 64 etc. The additional logic circuitry 114 associated with the data source 60 may be conveniently located with the data source to convert it from a standard source *to a source* suitable for operation in accordance with the data transfer apparatus of the present invention. This additional logic circuitry 114 may be considered as controlling the output of data from registers 66–72 onto the data lines 78 in response to the appearance of signal on the DAC line 83. This causes the two-bit counter 76 to operate that multiplexer 74 for establishing data signals on data line 78 which are representative of the operating conditions only of register 66. At the same time, the "data accepted" (DAC) signal is delayed through delay circuit 116, and the resulting delayed signal and a "ready for data" (RFD) signal appearing on line 81 are gated through gate 118 to the pair of OR gates 120, 122 cross-coupled as a flip-flop. This flip-flop produces a steady signal applied through driver amplifier 124 to the "data-valid" (DAV) line 79 a brief delayed time (determined by the delay circuit 116) after appearance of data signals on line 78. This delay interval allows such transient conditions as propagation delays of data signals along the line 78, reflections, and the like, to settle down immediately following introduction of new data signals on the lines 78. Thus, after the data signals have settled, the signal on DAV line 79 establishes that data is valid and can be accepted by the data receivers 62, 64, etc.

The DAV signal appearing on line 79 is sensed by the data receiver 62 to introduce a signal at gate 111 which is used to clock the data into the first register 102 of the shift register 100. The DAV signal appearing on line 79 is delayed by the first delay circuit 113 in the data receiver 62 to enable gate 111 and also to initiate a second delay in the time required for signal to appear on line 115. The second-delayed signal is determined by delay circuit 117. The twice-delayed signal on line 115 thus provides indication that the data has been accepted by the data receiver 62. Also, the output of gate 111 is applied to clock the data signal into the first register 102 of shift register 100. The signal on line 115 is further delayed by delay circuit 119, after which delay the combination of the signal once delayed by delay circuit 113 and the signal three-times delayed by the additional delays of circuits 117 and 119 are applied to gate 121 which produces a signal indicative of the fact that data receiver 62 is again ready for data.

Considering the data source 60 once again, it will be apparent that the "data accepted" (DAC) signal produced by the data receiver 62 triggers the bit count counter 76 to the next state which causes the multiplexer then to output data on lines 78 which is representative of the operating condition of output register 68. Thereafter, and in response to the "ready for data" (RFD) signal appearing on RFD line 81, the data source 60 again indicates that the data signals on lines 78 are valid by producing the "data-valid" (DAV) signal on line 79. This causes the data receiver 62 to shift the data signals first applied to the register 102 of the shift register 100 to the subsequent register 104 and to apply the new data representative of the operating condition of the output register 68 of the data source 60 into the first register 102 of the shift register 100. The logic circuitry 125 associated with the data receiver 62 again produces the "data accepted" (DAC) signal which is applied via the distributed gate 110 to the DAC control line 83. The logic circuitry 125 also produces a "ready for data" (RFD) signal which is applied via the distributed gate 112 to the RFD control line 81 in the manner as previously described in connection with application of data signals to the register 102 in the first cycle of operation.

The operation of the data transfer apparatus according to the present invention thus continues in this manner until data signals representative of each of the operating conditions of output registers 66–72 are applied to the corresponding registers 102–108 of the shift register 100. The data representative of the operating condition of register 66 thus appears in register 108 and the data representative of the operating [ condition ] *conditions* of output register 72 appears in the register 102. The data present in the registers 102–108 of the shift register 100 may be converted by conventional circuitry to suitable code for driving the output display devices 80–86. Similarly, the fourth state of operation of the bit count counter 76 may thus be separately channeled to counter control apparatus of the data source 60 for introducing a new set of data signals into the output registers 60–72.

While only one data receiver 62 is described herein in detail, it should be apparent that other data receivers, which may operate according to conventional means, may be modified, for example, by including logic circuitry similar to the circuitry indicated generally at 125 for the purpose of responding to "data-valid" (DAV) signals appearing on line 79 and for producing "ready for data" (RFD) signals to be applied to control line 81 for producing "data accepted" (DAC) signals to be applied to control line 83. Where a plurality of data receivers is involved, each having a different time of response to data signals applied thereto, it should be understood that the "data accepted" (DAC) signal that appears on line 83 and that is applied to the logic circuitry 114 of the data source only appears when all data receivers 62, 64, etc. have accepted the data. It should be noted that the "ready for data" (RFD) signal that appears on line 81 for application to the logic circuitry 114 of the data source 60 only appears when all the data receivers 62, 64, etc. are ready for data. Operation of the data transfer apparatus of the present invention in this fashion thus assures that the data transfer may progress through a series of data transfer steps at a rate which is only limited by the slowest one of the data receivers present in the system. This obviates the need for synchronous operation of all data receivers simultaneously and within the same predetermined time periods of operations.

In addition, the data source 60 may include an AND gate 126 to detect both RFD and DAC being high which indicates an error condition, since a receiver device cannot be both ready for data and accepting at the same time. Such an error condition may be due to a cable disconnect, power failure or the like.

Figure 4:
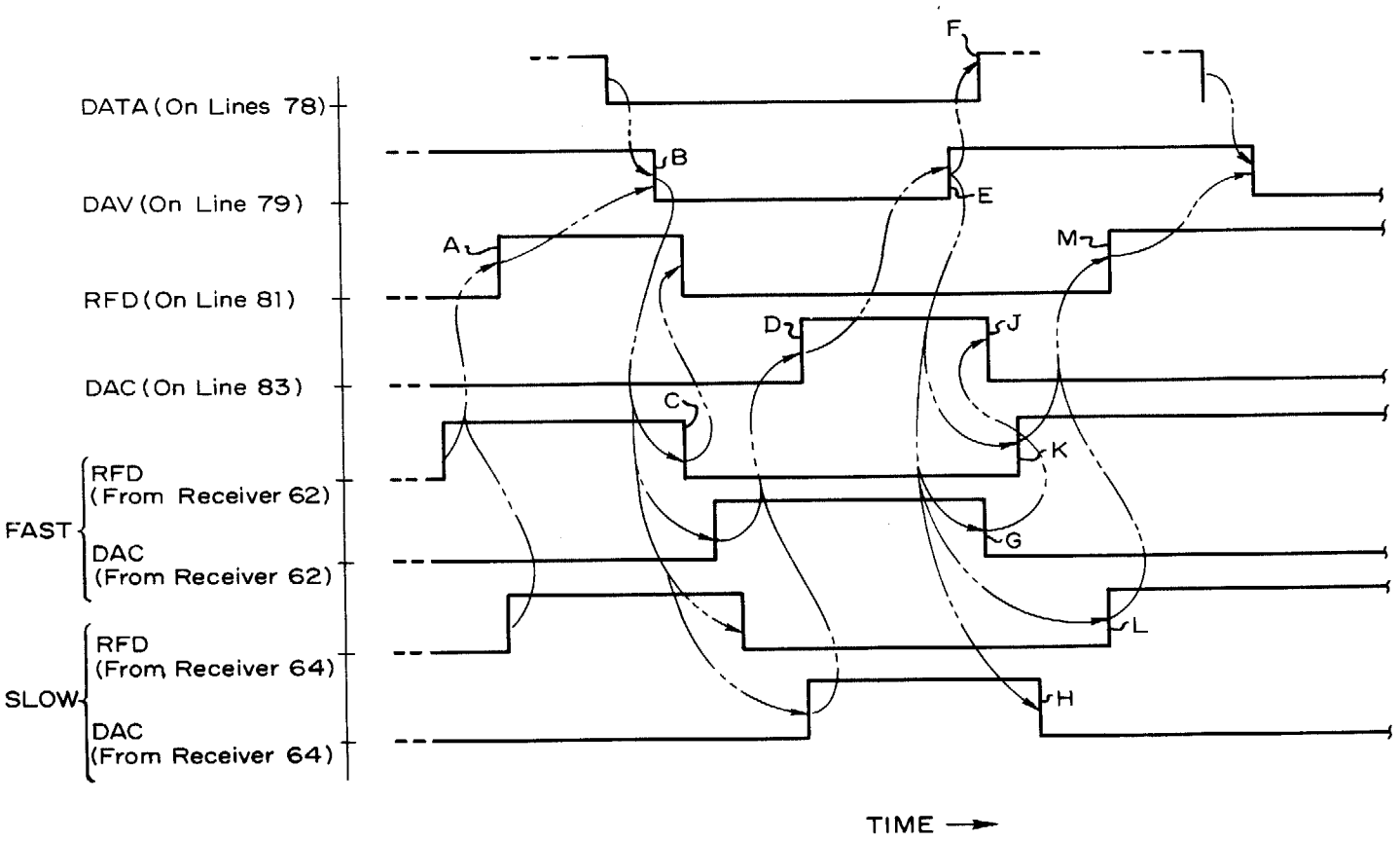
FIG. 4 is a graph showing the interaction as a function of time between data source and receivers in the apparatus of FIG. 2.

Referring now to FIG. 4, there is shown a graph of operating waveforms present in the data transfer apparatus of FIG. 2. At a given time in the operating cycle, one receiver 62 may signal that it is ready for data RFD. However, it is only after *all* receivers 62, 64, etc. are ready for data that the RFD signal A is produced on line 81 by a gating circuit 112 of the type, for example, as shown in FIG. 3. The logic equation for this operation is thus:

$$\text{RFD (on line 81)} = (\text{RFD from receiver 1})\ (\text{RFD from receiver 2})\ \ldots\ (\text{RFD from receiver n}) \qquad (Eq.\ 1)$$

Data signals which are produced on lines 78 by the data source 60 are not accepted by the receivers 62, 64, etc. until the data source 60 produces a data-valid (DAV) output B on line 79 after appearance of the RFD signal on line 81. Thereafter, the data receivers 62, 64, etc. accept the data and, because they are accepting the data, can no longer be ready for data. The first one of the data receivers 62, 64, etc. to respond to the data signals and the data-valid signal on line 79 will produce an $\overline{\text{RFD}}$ signal C which removes the RFD signal from line 81.

At a later time, the fastest one of the data receivers will produce a DAC (data accepted) signal. However, it is only after all data receivers have accepted data that the DAC signal D is produced on line 83 by the gating circuit 110 of the type, for example, as shown in FIG. 3. The logic equation for this operation is thus:

$$\text{DAC (on line 83)} = (\text{DAC for receiver 1})\ (\text{DAC from receiver 2})\ \ldots\ (\text{DAC from receiver n}) \qquad (Eq.2)$$

Thereafter, the data source 60 changes data signals by first removing the DAV signal E from line 79 to indicate that data signals on the data lines 78 are no longer valid. The source may then change the data signals F in accordance with its mode of operation.

At the same time, the data receivers 62, 64, etc. sense the DAV signal on line 79 and reset the DAC signals G, H produced by each of them. Of course, the fastest one of the data receivers to reset its DAC signal G also removes the DAC signal on line 83 according to the logic equation (2) above, which logic equation is implemented by the gating circuit shown in FIG. 3. Also, the data receivers 62, 64, etc. are then free to return to their respective ready-for-data operating conditions which are indicated by the RFD signals K, L produced by the receivers. However, it is only after all data receivers have produced RFD signals K, L that the RFD signal M is produced on line 81 in accordance with the logic equation (1) above, and this indicates the condition of readiness for another data transfer operating cycle.

Therefore, the apparatus of the present invention permits data to be transferred from one source to a plurality of receivers at a transfer rate that is determined only by the response time of the slowest receivers at each of the transfer operating steps.

I claim:

1. Data transfer apparatus comprising:

source means of data signals including register means for storing data signals to be transferred [;] *, said source means producing a logic signal after introduction of data signals into the register means and in response to an applied control signal, the logic signal being representative of the validity of data signals to be transferred;* a number of data-receiving means for operating upon applied data signals from the source means [,] *in response to appearance of said logic signal,* each of said number of data-receiving means including means for providing a first output indication of the operability thereof on applied data signals and means for providing a second output indication of the completed acceptance of applied data signals [, independently of the operation thereof on such applied data signals] ;

means coupling data signals from said source means to each of said number of data-receiving means;

[means responsive to the appearance of second outputs from all of said number of data-receiving means for terminating the data signals applied to each of said number of data-receiving means from said source means; and]

means responsive to the appearance of said first outputs from all of said number of data-receiving means for applying a control signal to [a] *the* source means [for introducing new data signals into said register means for application to all of said number of data-receiving means.] *; and*

*means responsive to the appearance of second outputs from all of said number of data-receiving means for applying a signal to said source means for terminating said logic signal and introducing new data signals into said register means.*

[2. Data transfer apparatus as in claim 1 in which said source means includes logic means for producing a logic output representative of the validity of data signals supplied to all of the number of data-receiving means from the register means of the source means, said logic means produces said logic output after new data signals are introduced into the register means and the first outputs from all of the number of data-receiving means ar present;

all of said number of data-receiving means accept the data signals from the receiver means of said source means only in response to the appearance of said logic output; and said logic means terminates said logic output in response to the appearance of said outputs from all of said number of data-receiving means.]

3. Data transfer apparatus as in claim 1 comprising:

a set of data signal lines coupling the register means of said source means to all of said number of data-receiving means and including a set of control lines coupled between all of said number of data-receiving means and said source means and including a data-valid (DAV) line, a ready-for-data (RFD) line and a data-accepted (DAC) line;

first gate means responsive to first outputs from all of said number of data-receiving means for applying to the source means a signal on said RFD line;

said source means being responsive to signal on said RFD line to produce a signal on the DAV line after introduction of data signals into the register means for coupling to all of said data-receiving means over said set of data signal lines;

each of said number of data-receiving means responds to signal on said DAV line and includes means for producing said second outputs after acceptance of such data signals; and second gate means responsive to the second outputs from all of said data-receiving means for applying to the source means a signal on said DAC line;

said source means being responsive to signal on said DAC line to terminate the signal on said DAV line and to introduce new data signals into said register means.

4. Data transfer apparatus as in claim 3 including detector means responsive to simultaneous presence of signals on said RFD and DAC lines for producing an output indication of the operating condition of the data transfer apparatus.

5. Apparatus for operation in a data transfer system including a number of data-responsive units coupled to respond to data and control signals on data and control channels, the apparatus comprising:

source means adapted to be coupled to data signal channels of a data transfer system for delivering valid data signals thereto;

logic means adapted to receive a first control signal from a control signal channel of a data transfer system which is indicative of the condition of readiness of all of the number of data-responsive units to receive data signals, said logic means being capable of delivering a second control signal to a control signal channel following receipt of such first control signal and the source means having delivered valid data signals, the second control signal having one logic state which is indicative of the validity of the data signals delivered by the source means; and said logic means being adapted to receive a third control signal from a control signal channel of the data transfer system which is indicative of all of the number of data-responsive units having accepted data signals for altering the second control signal to a second logic state which indicates that data signals are not valid and for enabling the source means to deliver updated data signals to data signal channels.

6. Apparatus as in claim 5 wherein said logic means enables said source means to deliver updated data signals to data signal channels within the interval from the appearance of a third control signal to the appearance of a second control signal.

7. Apparatus as in claim 5 wherein said logic means enables said source means to deliver updated signals to data signal channels within the interval from the appearance of the *second* control signal in the second logic state which indicates that data signals are not valid and the appearance of the second control signal in the one logic state which indicates that the delivered data signals are valid.

8. Apparatus as in claim 5 comprising error detecting means responsive to the appearance simultaneously of the first control signal indicative of the condition of readiness and the third control signal indicative of all of the number of data-responsive units having accepted data signals for producing an output indication of an erroneous operating condition of the data transfer system.

9. A data-responsive unit for operation in a data transfer system including a number of such data-responsive units which respond to data signals and control signals on data and control signal channels, the data-responsive unit comprising:

data-receiving means capable of receiving data signals from a data signal channel of a data transfer system and being adapted to deliver to a control signal channel a first control signal having a first logic state which indicates preparedness to receive data signals;

sensing means adapted to be coupled to receive from a control signal channel of the data transfer system a second control signal having a first logic state which is indicative of the validity of data signals for enabling the data-receiving means to receive the valid data signals from the data signal channel and to change the first control signal to a second logic state which indicates unpreparedness to receive data signals;

logic means adapted to deliver to a control signal channel a third control signal having a first logic state indicative of having accepted the data signals;

said sensing means being responsive to said second control signal attaining a second logic state which indicates that data signals are not valid for changing the third control signal to a second logic state indicative of completion of a data transfer; and said data-receiving means being responsive to the third control signal attaining the second logic state and being prepared to accept new data signals for changing the first control signal to said first logic state.

10. A data-responsive unit as in claim 9 wherein said data-receiving means and said logic means are coupled to inhibit operations thereof simultaneously in the associated first logic states thereof.

11. A data-responsive unit as in claim 9 wherein said data- [responsive] *receiving* means includes operative means for manipulating applied data signals at a rate substantially independent of the rate at which data signals are applied, and including buffer means for retaining applied data signals for a period required by the operative means to manipulate data signals, said data-receiving means producing the first control signal in said first logic state in response to said buffer means being prepared to accept data, independently of the preparedness of the operative means to manipulate data signals.

12. A data-responsive unit as in claim 9 comprising first gating means for cooperating with all similar first gating means associated with all of the remaining number of data-responsive units coupled to a common control signal channel for producing said first control signal on said common control signal channel only in response to all of the number of associated data-receiving means being prepared to accept data signals.

13. A data-responsive unit as in claim 9 comprising second gating means for cooperating with all similar second gating means associated with all of the remaining number of data-responsive units coupled to a common control signal channel for producing said third control signal on said common control signal channel only in response to all of the number of associated logic means having accepted the data signals.

14. Data transfer apparatus as in claim [2] *1* wherein:

said means coupling data signals from said source means applies the data signals in parallel to each of said plurality of data-receiving means; and a gate circuit is coupled to said source means and to each of said plurality of data-receiving means for a. terminating the data signals from said source means [in response to the appearance in common of all the second outputs from said plurality of data-receiving means], and b. for activating said source means to apply successive data signals in parallel to said plurality of data-receiving means in response to the appearance in common of said [first] *second* outputs from said plurality of data-receiving means.

15. Process for transferring successive, updated data signals from a source thereof to a plurality of data-signal receivers, each of which indicates its preparedness to receive data signals and which indicates it completed acceptance of applied data signals, the process comprising the steps of:

applying the data signals in common to all of the plurality of data-signal receivers from the source;

terminating the application of the data signals in common to all of the plurality of data-signal receivers only in response to all of the plurality of receivers indicating their completed acceptance of the applied data signals; and controlling the source to apply successive, updated data signals in common to all of the plurality of data-signal receivers only in response to all of the plurality of receivers indicating their preparedness to receive data signals.

16. Process according to claim 15 wherein the source indicates its completion of the updating to successive data signals, the process comprising the additional steps of:

activating all of the plurality of data-signal receivers to receive the updated, successive data signals in common from the source only in response to the indication therefrom of completion of the updating to the successive data signals; and terminating the indication by the source of its completion of the updating in response to all of the plurality of data-signal receivers indicating their acceptance of the applied data signals.

17. Process as in claim 16 comprising the additional step of:

producing an error indication in response to the simultaneous presence of indications that the data-signal receivers are prepared to receive data signals and have completed acceptance of applied data signals.

*18. Process for transferring data signals from a source thereof to a plurality of data receivers, each of which is enableable to receive applied data signals in response to a control signal and which indicates its preparedness to receive data signals and also which indicates its completed acceptance of applied data signals, the process comprising the steps of:*

*supplying the data signals in common to all of the data-signal receivers from the source;*

*applying a control signal to the data-signal receivers to enable them to receive the data signals from the source after all of the data-signal receivers indicate their preparedness to receive data signals;*

*terminating the control signal to disable the data-signal receivers from receiving the data signals after all of the data-signal receivers indicate their completed acceptance of the data signals; and*

*activating the source to supply successive data signals in common to all of the data-signal receivers after all of the data-signal receivers indicate their completed acceptance of the data signals.*

*19. Process as in claim 18 wherein in the step of applying, the control signal is applied to the data-signal receivers after all the data-signal receivers indicate their preparedness to receive the data signals and after a selected delay period following the supplying of data signals, which delay period is sufficient to allow reflections and transients in the steady-state data signals to decay away.*

*20. Process for transferring successive, updated data signals from a source thereof to a plurality of data receivers, each of which is enableable to receive applied data signals in response to a control signal and which indicates it preparedness to receive data signals and also which indicates its completed acceptance of applied data signals, the process comprising the steps of:*

*supplying the data signals in common to all of the data-signal receivers from the source;*

*applying a control signal to the data-signal receivers to enable them to receive the data signals from the source after all of the data-signal receivers indicate their preparedness to receiver data signals;*

*restoring all the data-signal receivers to a condition indicative of not being prepared to receive data signals in response to the application of the control signal thereto;*

*terminating the control signal to disable the data-signal receivers from receiving the data signals after all of the data-signal receivers indicate their completed acceptance of the data signals;*

*restoring all the data-signal receivers to a condition indicative of not having completed acceptance of applied data signals after termination of the control signal;*

*actuating all the data-signal receivers to a condition indicative of being prepared to receive data signals after all the data-signal receivers indicate the condition of not having completed acceptance of applied data signals; and*

*activating the source to supply successive data signals in common to all of the data-signal receivers after all of the data-signal receivers indicate their completed acceptance of the data signals.*

*21. Process as in claim 20 wherein in the step of applying, the control signal is applied to the data-signal receivers after all the data-signal receivers indicate their preparedness to receive the data signals and after a selected delay period following the supplying of data signals, which delay period is sufficient to allow reflections and transients in the steady-state data signals to decay away.*

* * * * *

UNITED STATES PATENT AND TRADEMARK OFFICE

CERTIFICATE OF CORRECTION

PATENT NO. : Re: 29,246

DATED : May 31, 1977

INVENTOR(S) : David W. Ricci

It is certified that error appears in the above-identified patent and that said Letters Patent are hereby corrected as shown below:

Column 2, line 4, immediately after the word "display" second occurrence insert-,- line 23, immediately after the word "will" substitute the word "be" for --become--.

Column 4, line 47, immediately after the word "operate" substitute the word "that" for --the--.

Column 5, line 59 substitute the figure "60" for --66--; line 65, substitute the word "at" for --as--.

Column 7, line 68 substitute "ar" for --are--.

Signed and Sealed this

*sixteenth* Day of *August 1977*

[SEAL]

*Attest:*

RUTH C. MASON
*Attesting Officer*

C. MARSHALL DANN
*Commissioner of Patents and Trademarks*